Nov. 7, 1939.   P. V. OSBORN   2,178,671
APPARATUS FOR MANUFACTURING FINNED TUBING
Filed Nov. 10, 1937   4 Sheets-Sheet 1
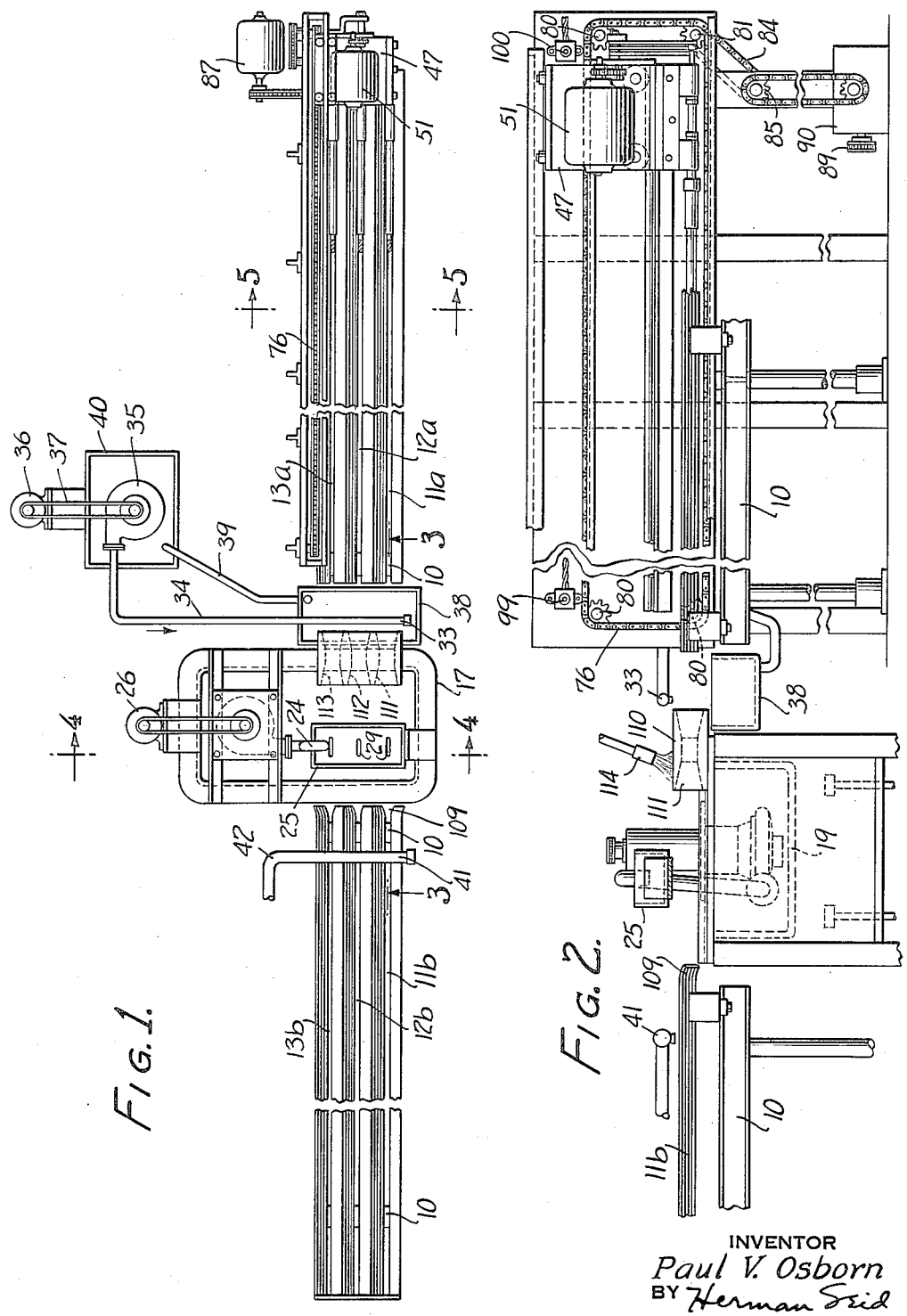
INVENTOR
Paul V. Osborn
BY Herman Srid
ATTORNEY Patented Nov. 7, 1939

2,178,671

UNITED STATES PATENT OFFICE 2,178,671

APPARATUS FOR MANUFACTURING FINNED TUBING

Paul Victor Osborn, Syracuse, N. Y., assignor to Carrier Corporation, Syracuse, N. Y., a corporation of Delaware Application November 10, 1937, Serial No. 173,737

4 Claims. (Cl. 113—59)

This invention relates to the fabrication of finned tubing.

The general object of the invention is to provide an improved method of and apparatus for soldering fin material to a conduit about and upon which it is positioned. Although the invention is described herein with particular reference to fin material wound in the form of a continuous spiral, it will be understood that the invention is not restricted to this application.

It is another object of the invention to provide an improved method of and apparatus for soldering to a conduit fin material wound thereabout, which result in the production of highly satisfactory finned conduit material at relatively low cost.

It is another object of the invention to provide a method of and apparatus for soldering to a conduit fin material positioned thereabout which require the use of relatively little solder and which result in the production of secure, permanent and clean-looking solder junctions.

It is another object of the invention to provide an apparatus for soldering fin material to a tube about which it is wound, which is relatively simple, inexpensive and reliable in operation.

A feature of the invention resides in discharging molten solder upon a conduit having positioned thereabout fin material which is to be soldered thereto, said conduit being rotated sufficiently rapidly to throw off, by centrifugal force, excess solder supplied thereto.

Another feature of the invention resides in discharging molten solder from one or more points upon a fast-revolving conduit having positioned thereabout fin material which is to be soldered thereto, and effecting relative motion, axially of the conduit, between said conduit and said point or points of solder discharge. In a preferred form of the invention, the rotating conduits are axially propelled, but the invention contemplates that the conduits may remain in fixed axial position while the point or points of solder discharge are moved therealong. So long as relative axial motion is effected between the conduit and the point of solder discharge, by moving either or both, the objects of the invention may be attained.

Another feature of the invention resides in the provision of a trough or the like, open or recessed at the bottom thereof, for receiving a conduit about which fin material such as thin copper sheeting has been positioned; means for rotating at high speed and for axially moving the conduit in the trough; and means for supplying molten solder to the conduit revolving in the trough. The trough serves to support and guide the conduit, and yet, in spite of the fact that excess solder is thrown from the rotating conduit, the trough does not become clogged because it is open or recessed at the bottom. This arrangement also precludes the accumulation of dirt and the like in the trough, and assures clean, secure and lasting solder connections.

Another feature of the invention resides in permitting molten solder to drip downwardly from a fixed point, upon a rapidly rotating and axially moving conduit having fin material positioned thereabout, to effect soldering of said material to said conduit.

Another feature of the invention resides in supplying liquid solder flux to a conduit having fin material positioned thereabout, said conduit being rapidly rotated, and then supplying molten solder to the rotating conduit.

Another feature of the invention resides in the provision of novel means for heating the conduit after it has been supplied with flux and before solder has been supplied thereto, said means including an apertured block through which the conduit is passed and a heater for heating the block. This arrangement renders the fluxing action more effective, renders the soldering action more effective, and prevents flux and solder from becoming mixed with each other.

Another feature of the invention resides in the provision of a solder melting pot, heated by suitable gas burners or the like, over which pot a conduit provided with fin material is passed while being rotated; a solder drip pot positioned over said conduit and adapted to discharge molten solder upon said rotating finned conduit, whereby excess solder dripped upon said conduit falls into said melting pot; and pumping means for supplying molten solder from said melting pot to said solder drip pot.

Another feature of the invention resides in the provision of a plurality of relatively long trough-like guides for supporting and guiding in side-by-side and parallel relation a plurality of conduits about each of which fin material has been placed, as by being wound thereon in the form of continuous spirals; a movable carriage adapted to move lengthwise of said guides; and electric motor mounted on said carriage; a plurality of spindles mounted on said movable carriage, each spindle being rotated by said motor and engaging one of said conduits, whereby the conduits are rotated at relatively high speed and are moved axially within said guides responsive to movement of said carriage; and means for discharging soldering flux and then molten solder upon the rotating and axially moving conduits.

Other objects and features of the invention will be more apparent from the following description, to be read in connection with the accompanying drawings, in which Fig. 1 is a plan view of an apparatus embodying the invention, Fig. 2 is a front elevational view of the apparatus of Fig. 1, Fig. 3 is an elevational sectional view taken on the line 3—3 of Fig. 1, Fig. 4 is a sectional elevational view taken on the line 4—4 of Fig. 1;

Figure 3:
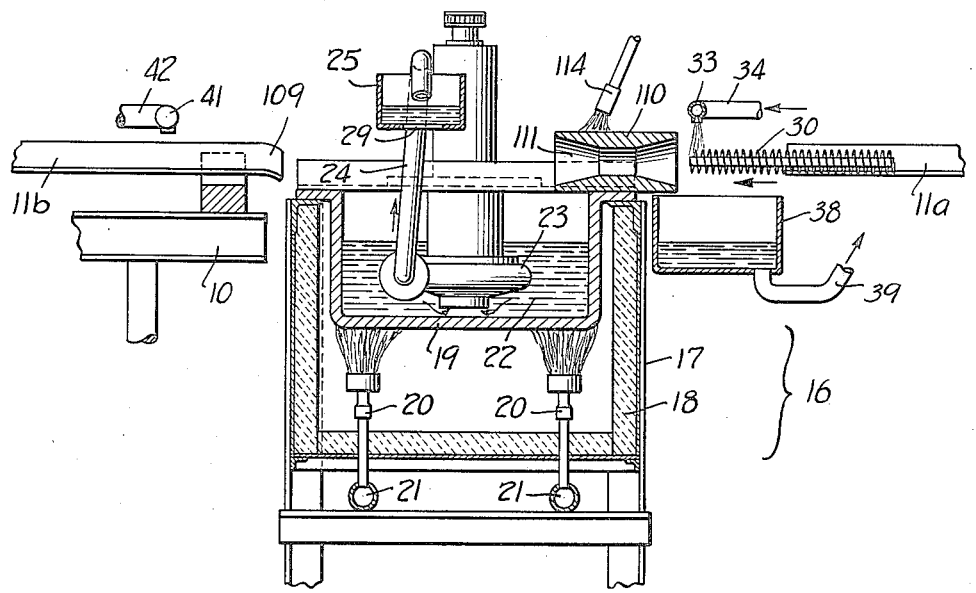
Figure 4:
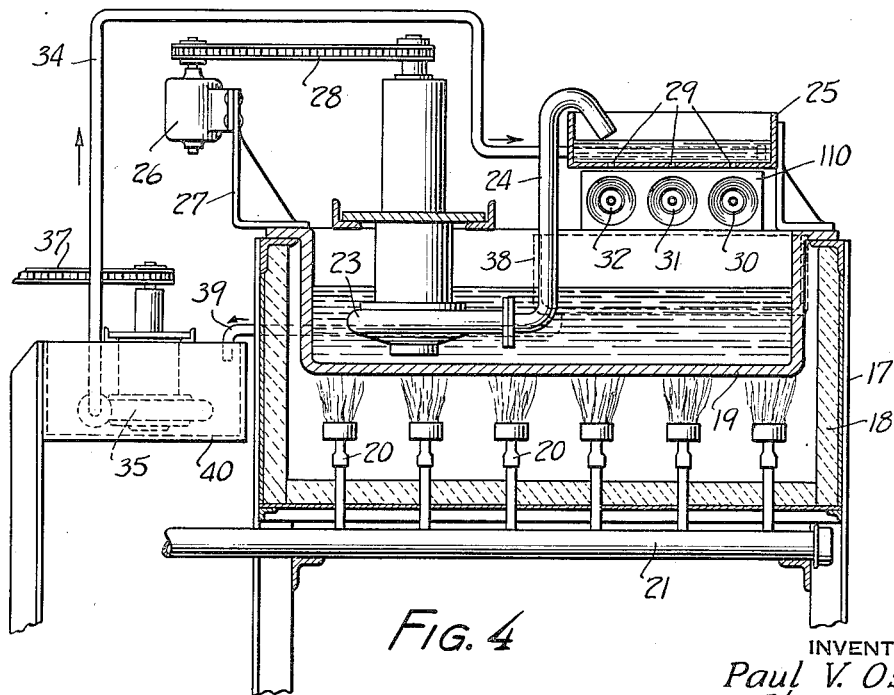

Referring now to the drawings, similar designations referring to similar parts, the numeral 10 designates generally, a frame structure which supports a plurality of troughs in which the conduits to be treated are carried. Depending upon the number of conduits which it is desired to treat, any number of troughs may be provided. As illustrated, there are provided three troughs, each of which is parallel to the others, and in side-by-side relation therewith. Each trough is discontinuous and formed in two sections. Thus, in Fig. 1, the trough nearest the front of the apparatus comprises a right-hand portion 11a and a left-hand portion 11b. The two other troughs of the apparatus as illustrated similarly comprise sections 12a and 12b, and 13a and 13b. In a preferred form of the invention the troughs are formed by plates 14 of any suitable material suitably secured to the frame 10 as by screws 11. Each pair of plates 14 is arranged in V formation to provide the notch or trough in which the tubes or conduits to be treated may be carried. The plates 14 are arranged to provide an opening 15 at the bottom of each trough, thus to prevent the accumulation of solder, dirt and foreign matter which might occur if the troughs were not formed with such openings at the bottom thereof. It has been found that preventing the accumulation of dirt and foreign matter within the troughs is important in obtaining consistently satisfactory results.

Between the left-hand and right-hand sections of the troughs is provided fluxing and soldering apparatus generally designated 16. In a preferred form of the invention there is provided a heating chamber 17 insulated by suitable thermal insulating or refractory material 18. Within the chamber 17 is positioned solder melting pot 19 which is heated by burners 20 supplied with gas or other suitable fuel by supply pipes 21. A sufficient number of burners 20 is supplied, and enough fuel is supplied to the burners, to maintain the solder 22 in pot 19 in molten state. Preferably, the top of the side walls of solder pot 19 and the top of chamber 17 are approximately at the level but slightly below the level of the troughs. Molten solder is drawn from the pot 19 by pump 23 and supplied thereby through solder supply pipe 24 to solder drip pot 25. Pump 23 is driven by motor 26, suitably mounted as upon bracket 27, through pump drive chain 28. Solder drip pot 25 is positioned at a level slightly higher than that of the troughs. The bottom of solder drip pot 25 is provided with a plurality of openings or slots 29, arranged in alignment with the troughs. Thus, molten solder is permitted to drip from the solder pot 25 downwardly upon the tubes 30, 31, and 32 as these tubes pass over the solder melting pot 19 from the right-hand portions to the left-hand portions of the troughs in which they are respectively located. Thus, excess solder supplied to the tubes through the openings 29 may fall directly into the solder melting pot 19 and be reheated. As will be understood, the charge of the solder melting pot 19 will be replenished from time to time as required.

To flux the tubes provided with fin material wound thereabout before the tubes are subjected to the action of solder dripping from the solder drip pot 25, there is provided a distributing header 33 for spraying or dripping liquid flux of any suitable type or composition upon the tubes. Since various fluxes of this type are well known and generally available, no detailed description thereof is deemed required here. The header 33 extends transversely of the tubes, as best seen in Figs. 1 and 3. The header 33 receives liquid flux through pipe 34 under the influence of flux pump 35, suitably driven as by motor 36 and chain drive 37. Excess flux supplied to the tubes is caught in flux tank 38 whence it drains through tube 39 to tank 40 in which the flux pump 35 is located.

After the tubes have been subjected to the action of the fluxing agent and the liquid solder, they are preferably cooled by a water spray from water header 41 served by supply pipe 42, provided with any suitable valve means (not shown) for regulating the rate at which water is supplied to header 41.

In operation, the tubes or conduits having fin material positioned thereabout are placed in the right-hand section of each trough. If desired, the tubes may be so placed manually or, if desired, the tubes may be supplied to the troughs by any suitable means such as chutes or the like, which preferably lead from the machinery in which the fin material has been positioned or wrapped about the tubes. The tubes upon being supplied to the right-hand trough sections are then engaged by suitable means for rapidly rotating the tubes and for moving them axially along the right-hand trough sections, then under the flux and molten solder discharged from header 33 and drip pot 25 respectively, and then to and along the left-hand trough sections, whence the tubes may then be removed manually or by suitable mechanical means.

The apparatus provided in a preferred form of the invention for effecting the rotation and axial movement of the tubes will now be described. At the right-hand portion of the apparatus and preferably at the rear thereof there is provided a supporting frame structure 43 which includes an angle iron or other suitable support 44 upon which is mounted a rail or the like 45, extending longitudinally of the apparatus. At the upper portion of the frame 43 there is provided a depending guide rail 46 also extending longitudinally of the apparatus. A movable carriage 47 is provided with rollers or the like, 48, adapted to ride upon the rail 45. Carriage 47 is also provided with a plurality of rollers 49 adapted to rotate about vertical axes and positioned upon opposite sides of guide rail 46. Engagement of the guide rail 46 between the rollers 49 on either side thereof stabilizes the movement of carriage 47 along the rail 45.

Upon the carriage 47 there is suitably mounted, as by means of brackets or the like, 50, an electric motor 51 supplied with electrical energy by suitable electrical leads. Through gearing 52, motor 51 drives a shaft 53 upon which are positioned sprockets 54, 55 and 56.

Figure 5:
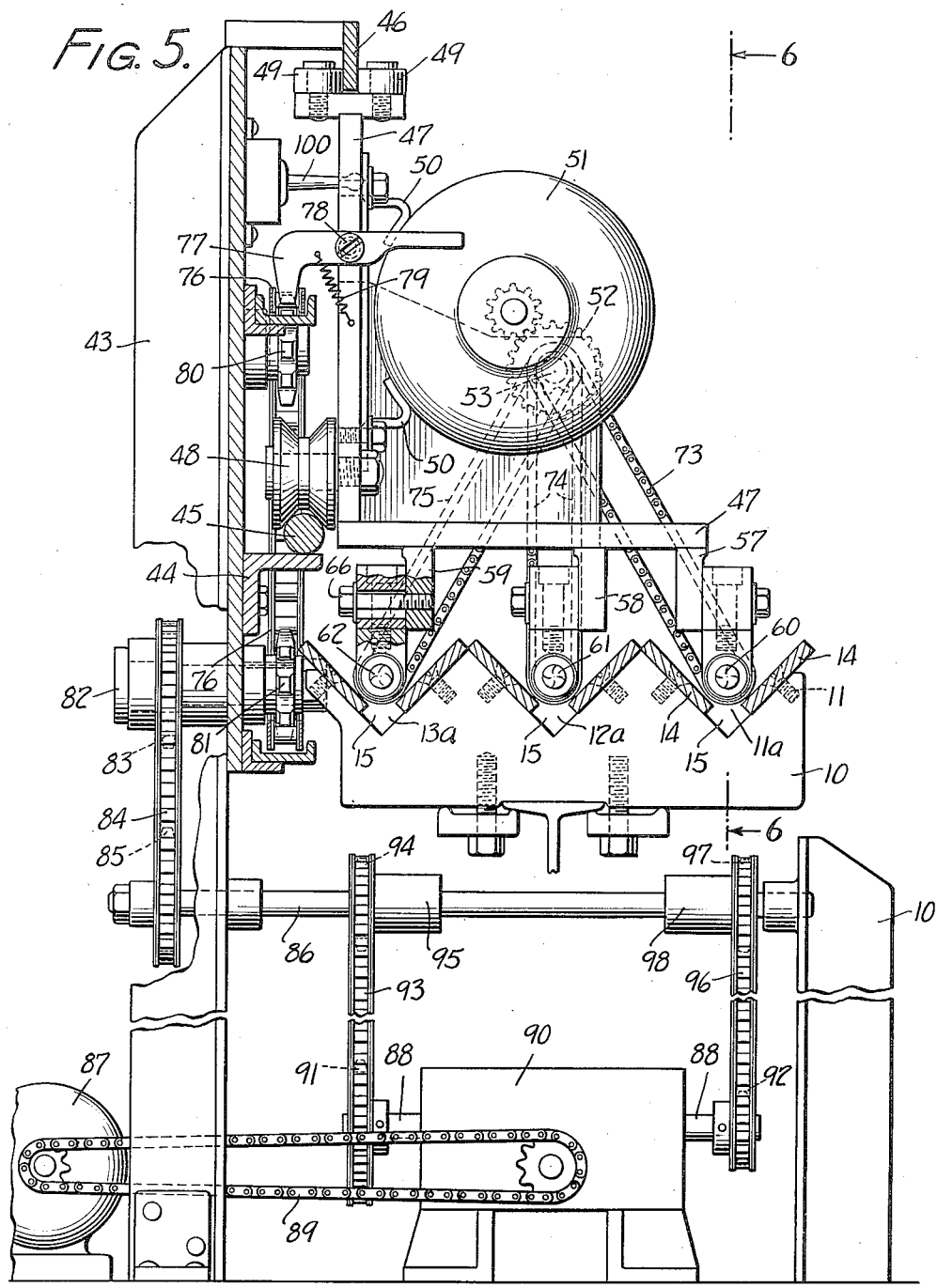
Fig. 5 is a sectional view taken on the line 5—5 of Fig. 1 illustrating the arrangement of the movable carriage upon which the spindles are mounted and by which they are driven, and the arrangement of the carriage-driving mechanism.
Figure 6:
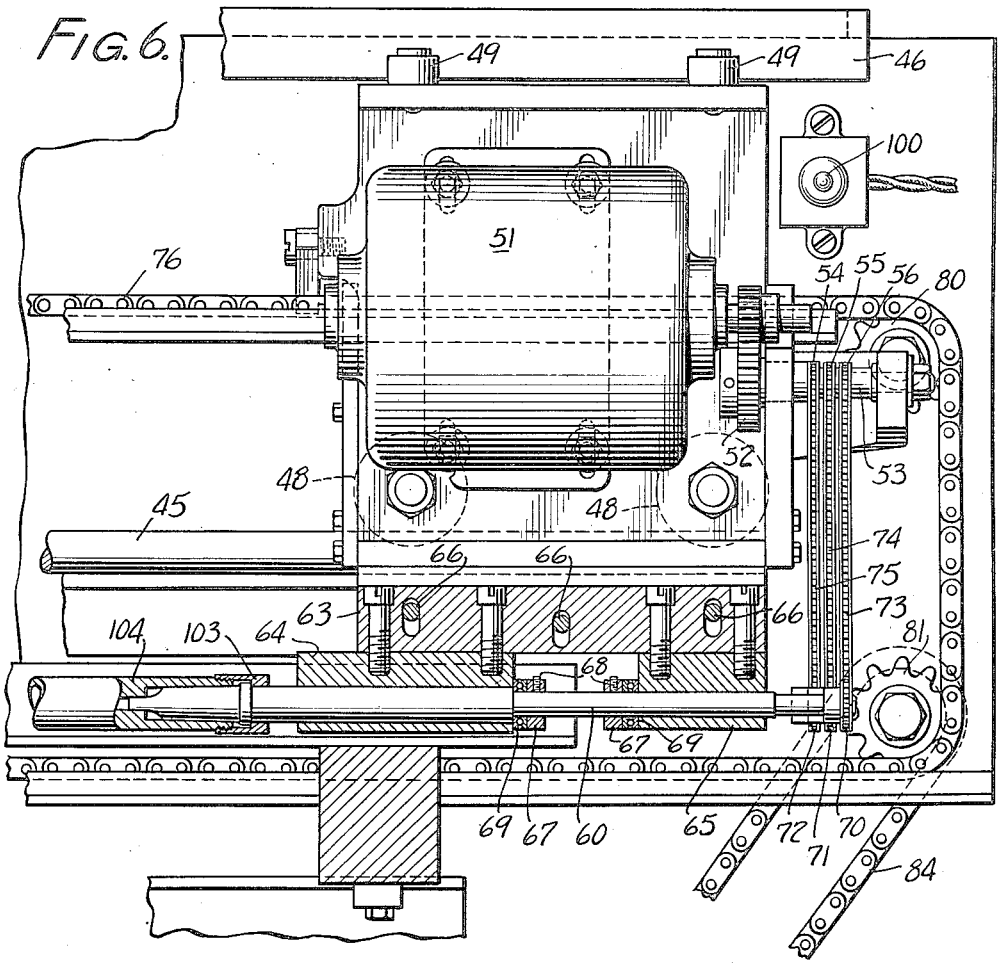
Fig. 6 is a view of the carriage and spindle arrangement, partly in section, taken on the line 6—6 of Fig. 5.

The lower portion of movable carriage 47 is provided with a plurality of supports 57, 58 and 59 for the spindles 60, 61, and 62. As best shown in Figs. 5 and 6, each of supports 57, 58 and 59 comprises a main supporting block 63 upon which are adjustably mounted journal pieces 64 and 65. Studs 66 extending from the main support 63 pass through vertical slots in the journal pieces. Thus, by loosening the head at the end of each stud 66 the journal pieces 64 and 65 may be adjusted to effect desired alignment of each spindle, the head of each stud being tightened when the desired alignment of the spindle has been effected.

For preventing axial displacement of the spindles with respect to the journal pieces 64 and 65, each spindle is provided with a pair of collars 67, mounted on the spindle between the journal pieces 64 and 65 supporting the same. These collars are secured to the spindle and arranged to rotate therewith by means of set screws or the like, 68. The collars 67 are pressed tightly in opposite directions against the outer discs of the bearings 69 which separate the collars from the adjacent ends of journal pieces 64 and 65.

The spindles are provided with sprockets 70, 71 and 72. Endless chain 73 drives sprocket 70 responsive to rotation of sprocket 56 mounted on the motor-driven shaft 53, chain 74 rotates sprocket 71 responsive to rotation of the sprocket 55, and chain 75 rotates sprocket 72 responsive to rotation of sprocket 54. In this way provision is made for the rotation of the spindles.

Axial displacement of the spindles, and hence of the tubes positioned within the troughs, is effected by moving the entire carriage 47 lengthwise of the apparatus. To this end there is provided an endless chain or the like, designated 76, with which the carriage 47 engages by means of a finger 77 carried upon carriage 47. Finger 77 is pivotally mounted upon carriage 47, as by stud 78. Preferably, the portion of the finger 77 which lies to the left of stud 78, as seen in Fig. 5, is of sufficient weight so that the finger 77 normally drops into the chain 76 for engagement therewith and to provide for driving of the carriage 47 thereby. If desired, a suitable spring arrangement may be utilized for urging the engaging portion of finger 77 in a downward direction as indicated at 79. Preferably, the chain 76 is of the roller variety so that in the event the carriage 47 should be prevented from travelling in the intended manner, the finger 77 will merely be raised as the several rollers of the chain pass therebeneath. In the absence of any unusual obstruction, of course, the downward force of the spring 79 and/or the weight of the left-hand portion of finger 77 will be sufficient to prevent such displacement of the finger 77 from the driving chain, and hence the intended movement of carriage 47 will be effected.

Chain 76 is carried by a plurality of idling sprockets 80 and by a driving sprocket 81. Driving sprocket 81 is mounted on a stud shaft 82 which is driven through a sprocket 83 carried thereon by a chain 84. Chain 84 in turn is driven by sprocket 85 carried on jack shaft 86.

Rotation of jack shaft 86 is effected by an electric motor 87 which drives double ended shaft 88 through chain drive 89 and suitable reduction gearing, indicated generally as 90. Both ends of shaft 88 rotate in the same direction and at the same speed. One end of shaft 88 carries a relatively large sprocket 91 and the other end of shaft 88 carries a relatively small sprocket 92. Sprocket 91 drives a chain 93 driving a sprocket 94 of a free-wheeling clutch device, designated generally as 95. Similarly, sprocket 92 drives a chain 96 driving a sprocket 97 of another free-wheeling clutch device, designated generally as 98. Each free-wheeling clutch device is so arranged that when its driving sprocket is driven in one direction, the shaft 86 will be turned by the clutch device and that when the sprocket is driven in a reverse direction, the clutch device will idle upon the shaft. As will be noted, the free-wheeling clutch devices 95 and 98 are arranged in back-to-back relation. Thus, although the devices are identical, only one of the free-wheeling clutch devices will drive the jack shaft 86 at any one time, and during this time the other free wheeling clutch device will idle. The free-wheeling clutch devices 95 and 98 are so arranged that when it is desired to move the carriage 47 to the left, in order to feed the tubes past the fluxing and soldering points, the driving of the jack shaft 86 will be effected through sprocket 92, chain 96, sprocket 97 and free-wheeling clutch device 98. Since sprocket 92 is relatively small, the carriage 47 will be moved at a relatively low rate of speed, high enough to effect relatively rapid soldering of the fin material to the conduit about which it is positioned but low enough to insure the proper soldering action.

However, when the carriage 47 has reached its extreme position to the left, it is desirable that it be returned as quickly as possible to its extreme right-hand position, in order that there may be little loss of time before the commencement of the next operating period. Thus, when the carriage 47 has reached its extreme position to the left, the motor 87 is reversed and the carriage 47 is returned to its extreme position at the right-hand end of the apparatus at relatively high speed under the driving action of relatively large sprocket 91. Limit switches 99 and 100 may be connected in the circuit of motor 87 automatically to reverse the direction of rotation of this motor in accordance with the position of carriage 47. Since limit switches and the manner in which they are utilized to control electrical circuits are well known and understood in the art, no further description thereof is deemed required here.

Preferably, the motor 51 is reversed at the same time as motor 87, so that at the end of an operating period the spindles will automatically and readily be withdrawn from the tubes with which they have been engaged.

If desired, of course, the carriage 47 may be returned manually at the end of an operating period, and in such case the arrangement of free-wheeling clutch devices described in connection with jack shaft 86 may be dispensed with, and the chain drive 76 may be driven at all times in the same direction. At the end of an operating period the finger 77 could then be manually lifted from engagement with the chain 76 and the carriage 47 manually pushed to its starting position. Under these conditions limit switches 99 and 100 might also be eliminated. However, it would still be desirable to reverse the direction of rotation of motor 51 at the end of an operating period in order to release the spindles from the tubes, and in the case of manual operation, this might be effected by the manipulation of a simple hand controlled reversing switch. Since such arrangements are so well known and understood, no further description is deemed required.

Figure 7:
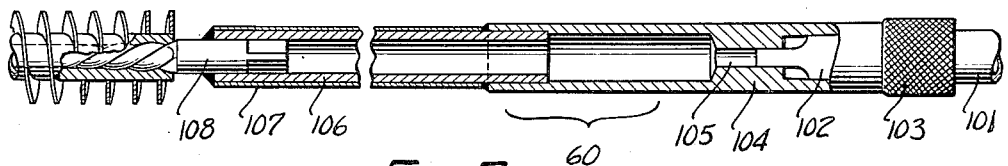
Fig. 7 is an elevational view, partly in section, illustrating a preferred spindle construction.

Figs. 6 and 7 illustrate a preferred form of spindle construction. As shown, the spindle shaft 101 is provided with a pronged extension 102 and an internally threaded collar 103. A member 104 is provided with an opening 105 adapted to receive the pronged extension of spindle shaft 101, member 104 being threaded within the collar 103. Member 104 receives a member 106 of slightly smaller diameter, the exterior of member 106 being encased by a sheet of aluminum 107. Within the member 106 is received the tube-engaging portion 108, of the spindle which may be of any desired type. Various types of screw extractors have been found to give satisfactory results in this connection. As the portion 108 is turned in one direction, its spiral formation insures rapid and secure engagement of a tube within which it is inserted; and when the spindle is rotated in a reverse direction, the tube is quickly and easily released.

The spindles are of sufficient length so that when the carriage 41 is at its extreme position to the left, the spindles will extend across the flux tank 38 and the solder melting pot 19. This gives assurance that all portions of the tubes will be subjected to the desired treatment. Although the aluminum sheets 107 of the spindles are thus subjected to the action of dripping solder, the solder does not build up upon the aluminum but is readily drained and thrown off therefrom.

The space between the left-hand and right-hand portions of each trough is so small as compared with the length of the tubes being treated that no substantial downward deflection of the tubes occurs as the tubes leave the right-hand portion and before they are supplied to the left-hand portions of the troughs. However, to counteract the effect of such slight deflection of the tubes as might occur, it is preferred to dip downwardly the right-hand extremities of the trough portions 11b, 12b, and 13b, as indicated at 109.

Preferably, there is provided an apertured block 110 of any suitable heat-conducting material, positioned at the upper extremity of the solder pot 19 and between the solder pot 19 and the flux return tank 38. The block 110 is formed to provide a plurality of passages 111, 112 and 113 through which the tubes in the process of treatment are passed. The passages 111, 112 and 113 preferably converge and then diverge, as shown in Figs. 1, 2 and 3. The block 110 is heated by a suitable burner, or the like, 114. Several advantages accrue from this arrangement. Firstly, solder which is thrown off from the tubes beneath the solder drip pot 25 is prevented to a very large degree from passing into the flux return tank 38. Any solder which may collect upon the block 110 and which might tend to become solidified and build up there is melted by the heat produced by burner 14, and thus drains to solder pot 19. The sloping sides of the passages 111, 112 and 113 give assurance that molten solder within the passages will flow out of the passages and into the solder melting pot 19. Similarly, any liquid flux which may be thrown off by the tubes being treated will be similarly prevented from mixture with the solder in melting pot 19 and will be drained back to flux return tank 38. Further, the action of both flux and solder is rendered more efficient by heating of the tubes as it passes through the block 110. Further, the block gives additional support to the tubes being passed from the right-hand trough portions to the left-hand trough portions and thus tends not only to provide for accurate alignment of the tubes but also serves to minimize the distortion of the tubes, so that the resultant jointure of fin material and tubes is highly satisfactory.

Since many changes may be made in the invention without departing from its scope, it is intended that all matter contained in the above description or shown in the accompanying drawings shall be interpreted as illustrative only and not in a limiting sense, applicant limiting himself only as indicated in the appended claims.

I claim:

1. In an apparatus for soldering to a conduit fin material positioned thereabout, means for supporting said conduit, means for rotating said conduit at relatively high speed, means for supplying flux to said conduit, means for dripping molten solder downwardly upon said rotating conduit, means for effecting relative movement axially of said conduit between said rotating conduit and said solder drip means and said flux supply means, a receptacle adapted to receive excess solder dripped upon said conduit, means for heating solder within said receptacle, means for recirculating molten solder from said receptacle to said solder drip means, a second receptacle adapted to receive excess flux supplied to said conduit, means for recirculating flux from said second receptacle to said flux supply means, said first receptacle for solder and said second receptacle for flux being positioned proximate each other, a member formed of heat-conducting material having formed therein a passage through which said conduit is adapted to be passed, opposite ends of said passage terminating over said first and said second receptacles respectively, the end portion of said passage which terminates over said first receptacle sloping downwardly towards said first receptacle, the end portion of said passage which terminates over said second receptacle sloping downwardly towards said second receptacle, and means for heating said member.

2. In an apparatus for soldering to a conduit fin material positioned thereabout, means for supporting said conduit, means for rotating said conduit at relatively high speed, means for supplying flux to said conduit, means for supplying molten solder to said rotating conduit, means for effecting relative movement axially of said conduit between said rotating conduit and said solder supply means and said flux supply means, a receptacle adapted to receive excess solder supplied to said conduit, means for heating solder within said receptacle, means for recirculating molten solder from said receptacle to said solder supply means, a second receptacle adapted to receive excess flux supplied to said conduit, means for recirculating flux from said second receptacle to said flux supply means, said first receptacle for solder and said second receptacle for flux being positioned proximate each other, a member formed of heat conducting material having formed therein a passage through which said conduit is adapted to be passed, opposite ends of said passage terminating over said first and said second receptacles respectively, the end portion of said passage which terminates over said first receptacle sloping downwardly towards said first receptacle, the end portion of said passage which terminates over said second receptacle sloping downwardly towards said second receptacle, and means for heating said member.

3. In an apparatus for soldering to a conduit fin material positioned thereabout, means for supporting said conduit, means for rotating said conduit at relatively high speed, means for supplying flux to said conduit, means for supplying molten solder to said rotating conduit, means for effecting relative movement axially of said conduit between said rotating conduit and said solder supply means and said flux supply means, a receptacle adapted to receive excess solder supplied to said conduit, means for heating solder within said receptacle, means for recirculating molten solder from said receptacle to said solder supply means, a second receptacle adapted to receive excess flux supplied to said conduit, means for recirculating flux from said second receptacle to said flux supply means, said first receptacle for solder and said second receptacle for flux being positioned proximate each other, a member formed of heat conducting material having formed therein a passage through which said conduit is adapted to be passed, opposite ends of said passage terminating over said first and said second receptacles respectively, and means for heating said member.

4. In an apparatus for soldering to a conduit fin material positioned thereabout, means for supporting said conduit, means for rotating said conduit at relatively high speed, means for supplying flux to said conduit, means for supplying molten solder to said rotating conduit, means for effecting relative movement axially of said conduit between said rotating conduit and said solder supply means and said flux supply means, a receptacle adapted to receive excess solder supplied to said conduit, means for heating solder within said receptacle, means for recirculating molten solder from said receptacle to said solder supply means, a second receptacle adapted to receive excess flux supplied to said conduit, means for recirculating flux from said second receptacle to said flux supply means, said first receptacle for solder and said second receptacle for flux being positioned proximate each other, a member formed of heat conducting material having formed therein a passage through which said conduit is adapted to be passed, opposite ends of said passage terminating above said first and said second receptacles respectively, said member being arranged with respect to said first and second receptacles so that fluid may drain from said member to said receptacles, and means for heating said member.

PAUL VICTOR OSBORN.